(12) United States Patent
Jeong et al.

(10) Patent No.: US 10,916,777 B2
(45) Date of Patent: Feb. 9, 2021

(54) ELECTRIC COPPER FOIL, AND CURRENT COLLECTOR FOR LITHIUM SECONDARY BATTERY AND LITHIUM SECONDARY BATTERY INCLUDING THE SAME

(71) Applicant: LS Mtron Ltd., Anyang-si (KR)

(72) Inventors: Eun-Seon Jeong, Gwangju (KR); Sang-Hyun Jun, Seoul (KR); Hyun-Woo Lee, Jeonju-si (KR); Gom-Bai Chon, Jeonju-si (KR); Dong-Woo Kim, Jeonju-si (KR)

(73) Assignee: KCF TECHNOLOGIES CO., LTD., Anyang-si (KR)

( * ) Notice: Subject to any disclaimer, the term of this patent is extended or adjusted under 35 U.S.C. 154(b) by 611 days.

(21) Appl. No.: 15/242,769

(22) Filed: Aug. 22, 2016

(65) Prior Publication Data
US 2017/0117552 A1   Apr. 27, 2017

(30) Foreign Application Priority Data

Oct. 21, 2015   (KR) ........................ 10-2015-0146488

(51) Int. Cl.
*H01M 4/66*      (2006.01)
*H01M 10/0525*   (2010.01)
*H01M 10/052*    (2010.01)

(52) U.S. Cl.
CPC ............ *H01M 4/661* (2013.01); *H01M 4/667* (2013.01); *H01M 10/052* (2013.01); *H01M 10/0525* (2013.01)

(58) Field of Classification Search
CPC .............................. H01M 4/661; H01M 4/667
See application file for complete search history.

(56) References Cited

U.S. PATENT DOCUMENTS

| 2012/0015206 A1† | 1/2012 | Kim |
| 2014/0193660 A1† | 7/2014 | Tsai |
| 2017/0141403 A1* | 5/2017 | Song ..................... H01M 4/661 |

FOREIGN PATENT DOCUMENTS

| CN | 102498600 A | 6/2012 |
| CN | 104583461 A | 4/2015 |
| KR | 10-2010-0125044 A † | 11/2010 |
| KR | 10-1500565 B1 | 3/2015 |
| WO | 2015/104999 A1 | 7/2015 |
| WO | 2015/142100 A1 | 9/2015 |

OTHER PUBLICATIONS

Chinese Office Action for related Chinese Application No. 201610921434.4; action dated Dec. 11, 2018; (6 pages).

* cited by examiner
† cited by third party

*Primary Examiner* — Ladan Mohaddes
(74) *Attorney, Agent, or Firm* — K&L Gates LLP

(57) ABSTRACT

An electric copper foil is applied as a current collector for a lithium secondary battery, and in a peak curve with respect to a (111) plane appearing on an X-ray diffraction analysis graph (a graph in which an X-axis variable is a diffraction angle 2θ and a Y-axis variable is an intensity of a diffracted X-ray) in a state where the electric copper foil is not thermally treated, the electric copper foil has a full width at half maximum (FWHM) of 0.08 or above and 0.15 or below.

7 Claims, 2 Drawing Sheets

ELECTRIC COPPER FOIL, AND CURRENT COLLECTOR FOR LITHIUM SECONDARY BATTERY AND LITHIUM SECONDARY BATTERY INCLUDING THE SAME

CROSS-REFERENCE TO RELATED APPLICATION(S)

This application claims priority to Korean Patent Application No. 10-2015-0146488, filed Oct. 21, 2015, the entire disclosure of which is incorporated herein by reference for all purposes.

BACKGROUND OF THE INVENTION

1. Field of the Invention

The present disclosure relates to an electric copper foil, and a current collector for a lithium secondary battery and a lithium secondary battery including the electric copper foil, and more particularly, an electric copper foil, and a current collector for a lithium secondary battery and a lithium secondary battery including the electric copper foil, which may improve characteristics of a secondary battery by means of improved quality.

2. Description of Related Art

A lithium secondary battery has many advantages such as relatively high energy density, high operation voltage, excellent preservation and long life span in comparison to other secondary batteries, and thus the lithium secondary battery is widely used for various portable electronic devices such as personal computers, camcorders, cellular phones, CD players, PDA or the like.

Generally, a lithium secondary battery includes a positive electrode and a negative electrode disposed with an electrolyte being interposed between them. Here, the positive electrode is configured so that a positive electrode active material is attached to a positive electrode current collector, and the negative electrode is configured so that a negative electrode active material is attached to a negative electrode current collector.

In the lithium secondary battery, the negative electrode current collector is generally made of an electrolytic copper foil, and the electrolytic copper foil should have excellent properties so that the performance of the secondary battery is maintained even though severe conditions are repeatedly formed in the secondary battery as the secondary battery is charged and discharged.

As properties required for the electric copper foil, for example, a wrinkle should not occur at the electric copper foil during an electric copper foil manufacturing process, and a discharge capacity retention rate should be maintained at or above a certain level even though a secondary battery manufactured using the electric copper foil is repeatedly charged and discharged.

Meanwhile, such excellent properties of the electrolytic copper foil may be ensured by adjusting various factors of the electrolytic copper foil, but it is very difficult to find which factor should be adjusted and how much the factor should be adjusted in order to obtain desired properties.

SUMMARY OF THE INVENTION

The present disclosure is designed to solve the problems of the related art, and therefore the present disclosure is directed to finding and controlling an important factor for manifesting excellent performance of a lithium secondary battery so that an electric copper foil may have properties required for manifesting excellent performance of the lithium secondary battery.

However, the technical objects to be accomplished by the present disclosure are not limited to the above, and other objects not mentioned above may be clearly understood from the following detailed description.

After the researches to accomplish the above object, the inventors of the present disclosure have found that in a 2θ (diffraction angle)-intensity graph obtained through X-ray diffraction experiments with respect to an electric copper foil at a room temperature and an electric copper foil thermally treated at a high temperature, an electric copper foil with excellent properties may be obtained if a full width at half maximum (FWHM) in a peak curve with respect to a (111) plane of the electric copper foil is maintained to have a consistent value. In addition, the inventors of the present disclosure have found that characteristics of a lithium secondary battery may also be maintained excellently during repeated charging and discharging processes by applying the electric copper foil with excellent properties to a current collector for the lithium secondary battery.

An electric copper foil according to an embodiment of the present disclosure, which may maintain characteristics of a lithium secondary battery excellent, is an electric copper foil applied as a current collector for a lithium secondary battery, wherein in a peak curve with respect to a (111) plane appearing on an X-ray diffraction analysis graph (a graph in which an X-axis variable is a diffraction angle 2θ and a Y-axis variable is an intensity of a diffracted X-ray) in a state where the electric copper foil is not thermally treated, the electric copper foil has a full width at half maximum (FWHM) of 0.08 or above and 0.15 or below.

In a peak curve with respect to a (111) plane appearing on an X-ray diffraction analysis graph (a graph in which an X-axis variable is a diffraction angle 2θ and a Y-axis variable is an intensity of a diffracted X-ray) in a state where the electric copper foil is thermally treated at 190° C. for 1 hour, the electric copper foil may have a FWHM of 0.099 or above and 0.11 or below.

The electric copper foil may have a protective layer formed at a surface thereof, and the protective layer may be made of at least one selected from the group consisting of chromate, BTA (benzotriazole) and a silane coupling agent.

The electric copper foil may have surface roughness of 0.3 μm or above and 1.5 μm or below.

The electric copper foil may have a gloss level of 20 GU or above and 500 GU or below at 60 degrees of an M side.

Meanwhile, a current collector for a lithium secondary according to an embodiment of the present disclosure is made of the above electric copper foil according to an embodiment of the present disclosure, and a lithium secondary battery according to an embodiment of the present disclosure includes the electrode current collector for a lithium secondary battery according to an embodiment of the present disclosure.

BRIEF DESCRIPTION OF DRAWINGS

The accompanying drawings illustrate a preferred embodiment of the present disclosure and together with the foregoing disclosure, serve to provide further understanding of the technical spirit of the present disclosure, and thus, the present disclosure is not construed as being limited to the drawing.

DETAILED DESCRIPTION OF THE INVENTION

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

An electric copper foil 10 according to an embodiment of the present disclosure will be described with reference to FIG. 1.

Figure 1:
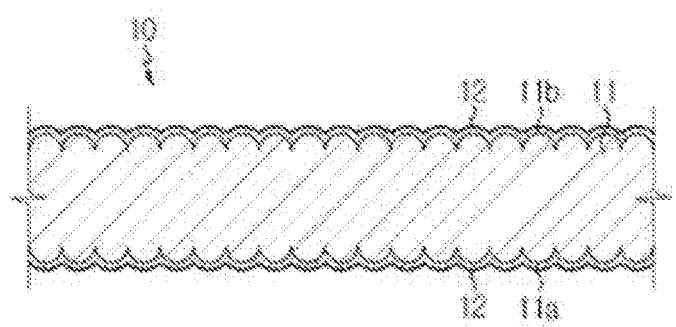
FIG. 1 is a cross-sectional view showing an electric copper foil according to an embodiment of the present disclosure.

FIG. 1 is a cross-sectional view showing an electric copper foil according to an embodiment of the present disclosure.

Referring to FIG. 1, the electric copper foil 10 according to an embodiment of the present disclosure includes a copper layer 11 and a protective layer 12 optionally formed at surfaces 11a, 11b of the copper layer 11.

The electrolytic copper foil 10 may be used as a negative electrode current collector of a lithium secondary battery. In other words, in the lithium secondary battery, the negative electrode current collector coupled to a negative electrode active material may employ the electrolytic copper foil 10. Meanwhile, a positive electrode current collector coupled to a positive electrode active material generally employs a foil made of aluminum (Al).

Accordingly, the present disclosure will be described based on a case where a current collector for a secondary battery according to an embodiment of the present disclosure, which employs the electric copper foil 10, corresponds to a negative electrode current collector.

The electric copper foil 10 according to an embodiment of the present disclosure is configured so that a full width at half maximum (FWHM) measured at a room temperature and/or a high temperature is controlled within a predetermined range.

Figure 2:
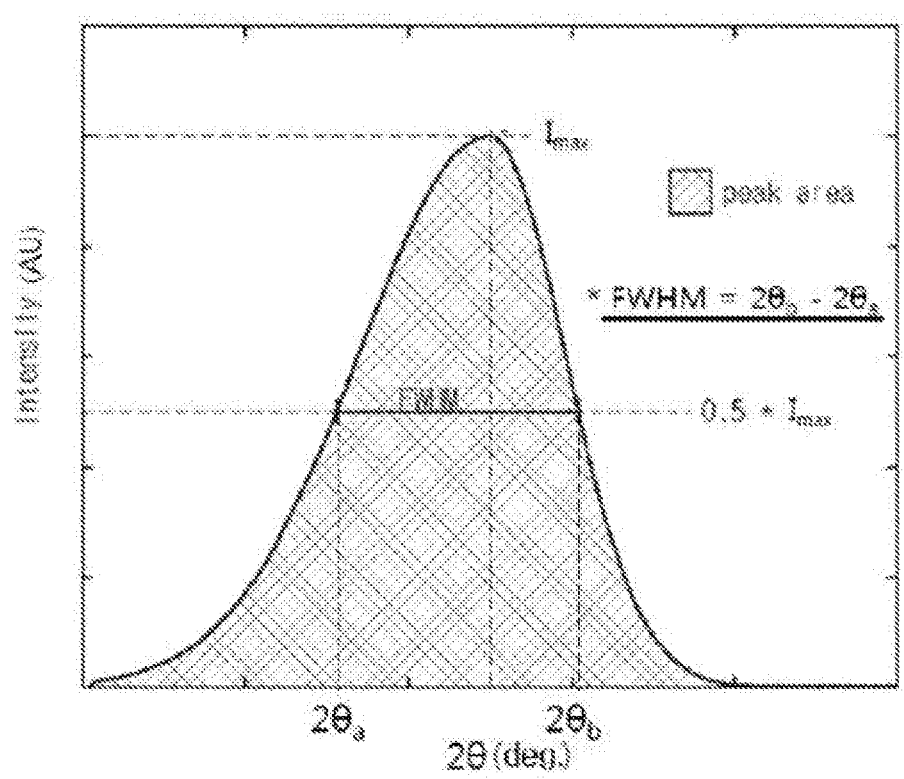
FIGS. 2 and 3 are diagrams for explaining a meaning of a full width at half maximum (FWHM) in detail.

Here, the FWHM is a value which may be obtained using a peak curve corresponding to a (111) plane, which is a crystal plane index of a copper foil sample, in a graph obtained through an X-ray diffraction experiment for the copper foil sample, as shown in FIG. 2. In detail, the FWHM means a difference between two different 2θ values (i.e., $2\theta_a$ and $2\theta_b$ corresponding to a half maximum intensity (i.e., 0.5×Imax) appearing in a peak curve with respect to the (111) plane.

Figure 3:
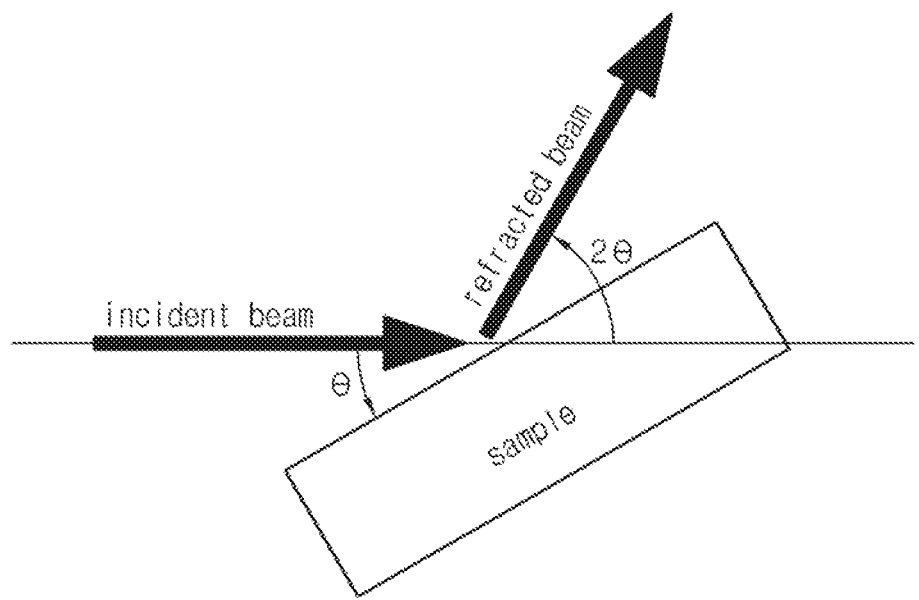

In addition, the 2θ value means a diffracted output angle, when X-ray is irradiated to the copper foil sample with an incident angle θ, as shown in FIG. 3.

The electric copper foil 10 according to an embodiment of the present disclosure has a FWHM of about 0.08 to 0.15, when being measured to the (111) plane at a room temperature during its manufacturing process. Here, the room temperature means a temperature at which a process is performed without thermal treatment during an electric copper foil manufacturing procedure, for example a temperature at which a roll-to-roll process for moving a copper foil is performed.

In the above range of FWHM, it is possible to prevent a wrinkle from occurring at the copper foil. Here, if the FWHM is lower than about 0.08, no further improvement is expected in relation to the occurrence of wrinkle at the copper foil. If the FWHM is higher than about 0.15, a crystal grain of the copper foil is too small, and thus it is difficult to control strength and elongation of the copper foil.

If the FWHM is out of the above range at a room temperature of the electric copper foil, a wrinkle is more likely to occur at the electric copper foil while the electric copper foil and the lithium secondary battery are being manufactured, and if a wrinkle occurs as above, the surface of the current collector may not be uniformly coated with a negative electrode material, which may cause deviated coating thickness and bad appearance of the negative electrode material and thus eventually result in deteriorated quality of a product.

Meanwhile, if the FWHM is within the above range at a room temperature of the electric copper foil 10 according to an embodiment of the present disclosure, it is possible to obtain an electric copper foil having strong resistance against the occurrence of a wrinkle, and if the electric copper foil having strong resistance against the occurrence of a wrinkle as above is used, a line speed (a production rate) of the roll-to-roll process may be increased, which may improve overall productivity for a product and enhance quality of a manufactured product (an electric copper foil and a lithium secondary battery).

Meanwhile, in the electric copper foil 10 according to an embodiment of the present disclosure, a FWHM measured to a (111) plane after thermal treatment (thermal treatment at about 190° C. for 1 hour) under a condition identical or similar to a high-temperature environment for an electric copper foil, applied as a negative electrode current collector, during a lithium secondary battery manufacturing procedure is in the range of about 0.099 to 0.11.

In this range of FWHM, when a lithium secondary battery manufactured using a negative electrode current collector to which the electric copper foil 10 according to an embodiment of the present disclosure is applied is repeatedly charged and discharged, the lithium secondary battery may exhibit an excellent capacity retention rate.

The FWHM at a room temperature of the electric copper foil 10 and the FWHM after high-temperature thermal treatment may have relations with the change of concentrations of copper and sulfate contained in a plating solution (an electrolytic solution) for plating in the electric copper foil manufacturing procedure, the change of concentrations of various additives (inorganic additive, leveler, brightener or the like) optionally added to the plating solution, the change of current density during the plating process and the change of temperature of the plating solution.

Meanwhile, the electric copper foil 10 according to an embodiment of the present disclosure is prepared by supplying a plating solution between a cylindrical negative electrode rotating at a predetermined speed and a positive electrode located at an opposite side by using a copper sulphate solution as the plating solution (an electrolytic solution) to electroplate, reduce and deposit copper to the surface of the rotating cylindrical negative electrode, with a thickness smaller than about 20 µm (if the electric copper foil has a smaller thickness, the current collector to which an active material is attached may be put into the secondary battery more, which is advantageous in enhancing capacity, but if the electric copper foil has a greater thickness, it is difficult to enhance capacity when being applied to the secondary battery, and thus the electric copper foil may have a thickness not greater than 20 µm).

Referring to FIG. 1 again, the electric copper foil produced by means of electroplating has two different sides. In other words, the electric copper foil has a shiny side (S side) 11a, which is in contact with a negative electrode drum, and a matte surface (M side) 11b, at which a crystal grain grows by means of deposition. The S side and the M side of the electric copper foil may have surface roughness (Rz) in the range of about 0.3 µm to 1.5 µm.

If the electric copper foil has seriously low surface roughness lower than about 0.3 µm, a binding force between the active material and the electric copper foil is deteriorated, which may lower the discharge capacity retention rate of the lithium secondary battery. Meanwhile, if the electric copper foil has seriously high surface roughness greater than about 1.5 µm, the active material and the electric copper foil may not contact uniformly, which may also lower the discharge capacity retention rate of the lithium secondary battery.

In addition, a gloss level at 60 degrees of the matte side (M side) measured at the surface of the electric copper foil 10 according to an embodiment of the present disclosure may be in the range of about 20 to 500 GU (gloss unit). This is because, if the gloss level is too low, the surface is seriously irregular due to too high surface roughness, and if the gloss level is too high, the surface is seriously smooth due to too low surface roughness.

Meanwhile, the protective layer 12 is optionally formed at the surface of the copper layer 11 for corrosion control of the electric copper foil 10 and may be made of at least one selected from the group consisting of chromate, BTA (benzotriazole) and a silane coupling agent. The protective layer 12 may also have a role of enhancing a heat-resistance property and/or a binding force with the active material in addition to the corrosion control of the electric copper foil 10.

1. Preparation of an Electric Copper Foil

EXAMPLE

As in Table 1, a plating solution was prepared to have a copper concentration of 70 to 80 g/L and a sulfate concentration of 80 to 110 g/L, and various additives (inorganic metal, leveler, brightener) were added thereto to prepare an electric copper foil under conditions with a temperature of about 40 to 45° C. and a current density of about 45 to 65 ASD (the above contents may be suitably adjusted, without being limited to the above ranges, as long as the object of the present disclosure can be accomplished).

Here, Fe, W, Zn, Mo or the like were applied as the inorganic additives, gelatin, collagen and PEG (polyethylene glycol) were used as the leveler, and SPS (bis(3-sulfopropyl)disulfide), MPS (mercapto-propane sulphonic acid) DPS (3-N,N-dimethylaminodithiocarbamoyl-1-propanesulphonic acid) were used as the brightener.

Meanwhile, for the protection (corrosion control) of the electric copper foil prepared according to the above process conditions, chromate was treated to the surface of the electric copper foil.

COMPARATIVE EXAMPLE

As in Table 1, various additives (identical to those of the Example) were added to a plating solution having a copper concentration of 70 to 80 g/L and a sulfate concentration of 95 to 105 g/L, thereby preparing an electric copper foil under conditions with a temperature of about 45° C. and a current density of about 50 to 60 ASD.

2. Measurement of FWHM of the Electric Copper Foil and Test of Performance According to MEM

TABLE 2

|  | FWHM (room temperature) | FWHM (high temperature) | room temperature effect (wrinkle) | high temperature effect (battery capacity retention rate: %) |
| --- | --- | --- | --- | --- |
| Example 1 | 0.114 | 0.099 | wrinkle X | 86 |
| Example 2 | 0.086 | 0.102 | wrinkle X | 84 |
| Example 3 | 0.126 | 0.109 | wrinkle X | 87 |
| Example 4 | 0.149 | 0.109 | wrinkle X | 90 |
| Example 5 | 0.108 | 0.110 | wrinkle X | 88 |
| Comparative Example 1 | 0.064 | 0.083 | wrinkle O | 42 |

TABLE 1

|  | Copper plating solution (g/L) | | | Additives (ppm) | | | current density (ASD) |
| --- | --- | --- | --- | --- | --- | --- | --- |
|  | copper | sulfate | temperature | inorganic metal | leveler | brightener |  |
| Example 1 | 70 | 80 | 40 | 4.5 | 0 | 1 | 45 |
| Example 2 | 75 | 80 | 45 | 4 | 0.5 | 1 | 50 |
| Example 3 | 80 | 110 | 45 | 4.5 | 0.5 | 0 | 55 |
| Example 4 | 70 | 110 | 40 | 4.5 | 0.5 | 0.5 | 60 |
| Example 5 | 70 | 100 | 45 | 5 | 1 | 1 | 65 |
| Comparative Example 1 | 80 | 95 | 45 | 1 | 2 | 1 | 50 |
| Comparative Example 2 | 70 | 105 | 45 | 1 | 2 | 1 | 50 |
| Comparative Example 3 | 80 | 95 | 45 | 1 | 1 | 2 | 55 |
| Comparative Example 4 | 70 | 110 | 45 | 3 | 2 | 1 | 60 |

TABLE 2-continued

|  | FWHM (room temperature) | FWHM (high temperature) | room temperature effect (wrinkle) | high temperature effect (battery capacity retention rate: %) |
|---|---|---|---|---|
| Comparative Example 2 | 0.061 | 0.092 | wrinkle O | 28 |
| Comparative Example 3 | 0.062 | 0.080 | wrinkle O | 32 |
| Comparative Example 4 | 0.075 | 0.113 | wrinkle O | 48 |

(1) FWHM Measurement Method

Measurement Method at a Room Temperature

Conditions for X-ray diffraction analysis of the copper foil:

Model name: D-8 Advance LynxEye (produced by BRUKER)

In the present disclosure, the above device having the following specification was used, but any device may be used as long as it allows X-ray diffraction analysis.

Target: Cu
Output: 40 kV, 40 mA
Wavelength: 1.5406 A
Measurement range: 20 to 100 deg
Scan axis: Theta-2Theta
Scan speed: 2 deg/min The X-ray diffraction analysis was performed based on the above specification, and then FWHM at a peak appearing in the (111) plane of the electrolytic copper foil was calculated from the obtained result.

Measurement Method at a High Temperature

After thermal treatment at 190° C. for 1 hour, X-ray diffraction analysis was performed in the same way as the measurement method at a room temperature, and then FWHM at a peak appearing in the (111) plane of the electrolytic copper foil was calculated from the obtained result.

(2) Effects According to FWHM

Effects at a Room Temperature

Figure 4:
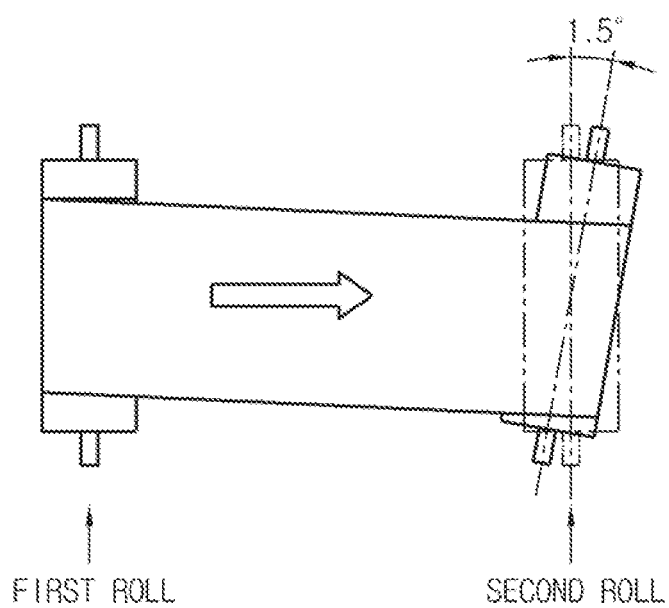
FIG. 4 is a diagram for illustrating an experiment method for determining whether a wrinkle occurs at an electric copper foil.

As shown in FIG. 4, an angle between a first roll and a second roll was set to be 1.5° to artificially cause misalignment, and then it was checked whether a wrinkle occurs at the copper foil when the copper foil progresses.

Seeing the test results in Table 2, particularly by comparing the results of Example 2 and Comparative Example 4, it may be found that it is advantageous to maintain the FWHM in the range of about 0.08 or above in order to prevent the occurrence of wrinkle. In addition, though not shown in the test results of Table 2, if the FWHM is greater than about 0.15, a crystal grain is too small, and thus it is difficult to control strength and elongation of the copper foil. Thus, it is advantageous to control the FWHM in the range of about 0.15 or below.

Effects at a High Temperature

Effects at a high temperature according to the FWHM were checked by measuring a capacity retention rate after charging/discharging tests were repeatedly performed 500 times to a lithium secondary battery prepared according to the following conditions. At this time, the lithium secondary battery was charged in a CCCV (constant-current constant-voltage) mode, with a charging voltage of 4.3V and a charging current of 0.2 C (a current allowing full charging within 5 hours), and was discharged in a CC (constant-current) mode, with a discharging voltage of 3.0V and a discharging current of 0.5 C (a current allowing full discharge within 2 hours). After charging and discharging were performed repeatedly as described above, a capacity retention rate of the lithium secondary battery was measured.

Seeing the test results in Table 2, particularly by comparing the results of Example 1 and Comparative Example 2, it may be found that it is advantageous to maintain the FWHM in the range of about 0.099 or above in view of the capacity retention rate of the lithium secondary battery. In addition, by comparing the results of Example 5 and Comparative Example 4, it may be found that it is advantageous to maintain the FWHM in the range of about 0.11 or below in view of the capacity retention rate of the lithium secondary battery.

Preparation of a Lithium Secondary Battery:

Preparation of a Positive Electrode Plate and a Negative Electrode Plate (Composition of a Positive Electrode Material Mixture)

Positive electrode material ($LiCoO_2$): 85 wt %, conductive agent (acetylene black): 8 wt %, binder (polyvinylidene fluoride): 7 wt %

(Composition of a Negative Electrode Material Mixture)

Negative electrode material (graphite or carbon material): 95 to 98 wt %, binder (polyvinylidene fluoride): 2 to 5 wt %

N-methyl pyrrolidone was added to the above material to make slurry, which was respectively applied to the surface of a positive electrode current collector made of an aluminum foil and the surface of a negative electrode current collector made of the electric copper foil, and after the solvent was evaporated, the resultant products were rolled and slit into a predetermined size to prepare a positive electrode plate and a negative electrode plate.

Assembling of a Lithium Secondary Battery.

A positive electrode plate, a separator (a hydrophilic-treated porous polyethylene film) and a negative electrode plate were stacked in order, and then rolled and put into a container, and then the container was sealed after an electrolytic solution was injected into the container, thereby completely making a battery. The battery was a cylindrical 18650-type battery, which was common in the art. Here, the electrolytic solution was prepared by dissolving 1M of $LiPF_6$ in a solvent in which ethylene carbonate (EC) and dimethyl carbonate (DMC) were mixed at a volume ratio of 1:1.

From the experiment results, it may be clearly found that if the FWHM is controlled within a predetermined range at a room temperature and/or high temperature, it is possible to productivity for an electric copper foil and a lithium secondary battery, and the lithium secondary battery has a capacity retention rate in a high level even though charging and discharging are repeatedly performed.

According to the present disclosure, an electric copper foil with excellent properties may be obtained, particularly for preventing occurrence of a wrinkle, and it is possible to minimize the decrease of a capacity retention rate of a lithium secondary battery even though the lithium secondary battery is repeatedly charged and discharged.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

What is claimed is:

1. An electric copper foil, wherein:
   the electric copper foil shows a first X-ray diffraction graph in which a first peak curve corresponding to a (111) plane has a first full width at half maximum (FWHM) of 0.08 to 0.15°,
   an X-axis variable of the first X-ray diffraction graph is a diffraction angle (2θ),
   a Y-axis variable of the first X-ray diffraction graph is an intensity of a diffracted X-ray, and
   the first FWHM is a difference between two different 2θ values corresponding to a half maximum intensity of the first peak curve.

2. The electric copper foil according to claim 1, wherein:
   after thermally treated at 190° C. for 1 hour, the electric copper foil shows a second X-ray diffraction graph in which a second peak curve corresponding to a (111) plane has a second FWHM of 0.099 to 0.11°,
   an X-axis variable of the second X-ray diffraction graph is the diffraction angle (2θ),
   a Y-axis variable of the second X-ray diffraction graph is the intensity of the diffracted X-ray, and
   the second FWHM is a difference between two different 2θ values corresponding to a half maximum intensity of the second peak curve.

3. The electric copper foil according to claim 2,
   wherein the electric copper foil has a protective layer formed at a surface thereof, and
   wherein the protective layer is made of at least one selected from the group consisting of chromate, BTA (benzotriazole) and a silane coupling agent.

4. The electric copper foil according to claim 2, wherein the electric copper foil has surface roughness (Rz) of 0.3 μm or above and 1.5 μm or below.

5. The electric copper foil according to claim 2, wherein a matte surface (M side) of the electric copper foil has a specular gloss of 20 GU or above and 500 GU or below at an incident angle of 60 degrees.

6. An electrode current collector comprising the electric copper foil according to claim 2.

7. A lithium secondary battery, comprising the electrode current collector according to claim 6.

* * * * *

UNITED STATES PATENT AND TRADEMARK OFFICE
CERTIFICATE OF CORRECTION

PATENT NO. : 10,916,777 B2
APPLICATION NO. : 15/242769
DATED : February 9, 2021
INVENTOR(S) : Eun-Seon Jeong et al.

It is certified that error appears in the above-identified patent and that said Letters Patent is hereby corrected as shown below:

In the Claims

At Column 9, Line 11, replace "20" with --2θ--
At Column 10, Line 2, replace "20" with --2θ--

Signed and Sealed this
Thirteenth Day of February, 2024

Katherine Kelly Vidal
*Director of the United States Patent and Trademark Office*